(12) United States Patent
Kikuchi et al.

(10) Patent No.: US 9,283,719 B2
(45) Date of Patent: Mar. 15, 2016

(54) OPTICAL COMPONENT AND METHOD OF MAKING THE SAME

(75) Inventors: Wataru Kikuchi, Warabi (JP); Daigo Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/410,194

(22) Filed: Mar. 1, 2012

(65) Prior Publication Data

US 2012/0224267 A1    Sep. 6, 2012

(30) Foreign Application Priority Data

Mar. 4, 2011    (JP) .................. 2011-047830

(51) Int. Cl.

| | |
|---|---|
| G02B 27/10 | (2006.01) |
| G02B 11/00 | (2006.01) |
| G02B 13/00 | (2006.01) |
| G02B 15/00 | (2006.01) |
| G02B 17/00 | (2006.01) |
| G02B 25/00 | (2006.01) |
| B29D 11/00 | (2006.01) |
| B29C 45/14 | (2006.01) |
| G02B 3/00 | (2006.01) |

(52) U.S. Cl.
CPC ...... *B29D 11/0073* (2013.01); *B29C 45/14065* (2013.01); *B29C 45/14819* (2013.01); *G02B 3/00* (2013.01)

(58) Field of Classification Search
CPC .............. G02B 3/0031; G02B 3/0012; G02B 27/0172; G02B 1/041; G02B 1/04; G02B 6/003; G02B 6/0065; G02B 7/02; B29C 41/40; B29C 45/40; B29C 2045/0049; B29C 45/14; B29C 45/2708; B29C 47/003; B29C 47/028; B29C 47/04; B29L 2011/0016
USPC ............ 359/620, 796, 797, 642; 264/1.7, 1.8, 264/2.2–2.4, 1.32
See application file for complete search history.

(56) References Cited

U.S. PATENT DOCUMENTS

| | | | | |
|---|---|---|---|---|
| 5,523,030 A | * | 6/1996 | Kingsbury | ............. 264/1.7 |
| 6,219,191 B1 | | 4/2001 | Iwaki | |
| 6,466,376 B1 | * | 10/2002 | Koshimizu et al. | ........... 359/642 |
| 2003/0081897 A1 | * | 5/2003 | Itoh et al. | ........... 359/708 |
| 2004/0245667 A1 | * | 12/2004 | Behle et al. | ............. 264/83 |
| 2007/0008629 A1 | * | 1/2007 | Chao | ........... 359/811 |
| 2008/0081108 A1 | * | 4/2008 | Yamada et al. | ........... 427/164 |
| 2008/0100921 A1 | * | 5/2008 | Nishikawa et al. | ........... 359/642 |
| 2011/0001865 A1 | * | 1/2011 | Hirao et al. | ........... 348/335 |
| 2013/0242406 A1 | * | 9/2013 | Kobayashi et al. | ........... 359/642 |

FOREIGN PATENT DOCUMENTS

| | | |
|---|---|---|
| CN | 1409144 A | 4/2003 |
| JP | 59-188601 A | 10/1984 |
| JP | 8-187793 A | 7/1996 |
| JP | 11-202106 A | 7/1999 |
| JP | 2006-108306 A | 4/2006 |

* cited by examiner

*Primary Examiner* — Alicia M Harrington
(74) *Attorney, Agent, or Firm* — Canon USA, Inc., IP Division

(57) ABSTRACT

A recessed portion, through which a covering plastic that has been melted and that is used for covering a core lens is introduced in a bifurcating manner, is formed in the core lens, and the covering plastic is introduced simultaneously onto the front and back surfaces of the core lens through the recessed portion.

9 Claims, 11 Drawing Sheets

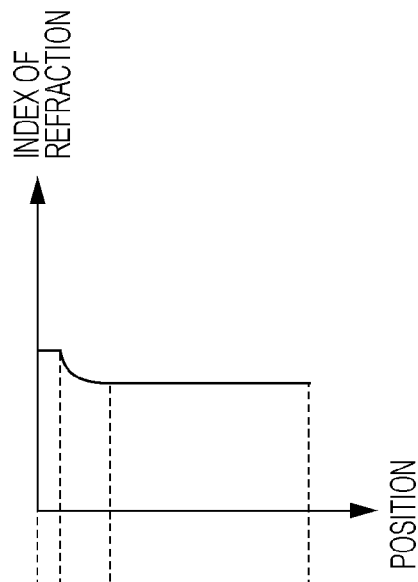
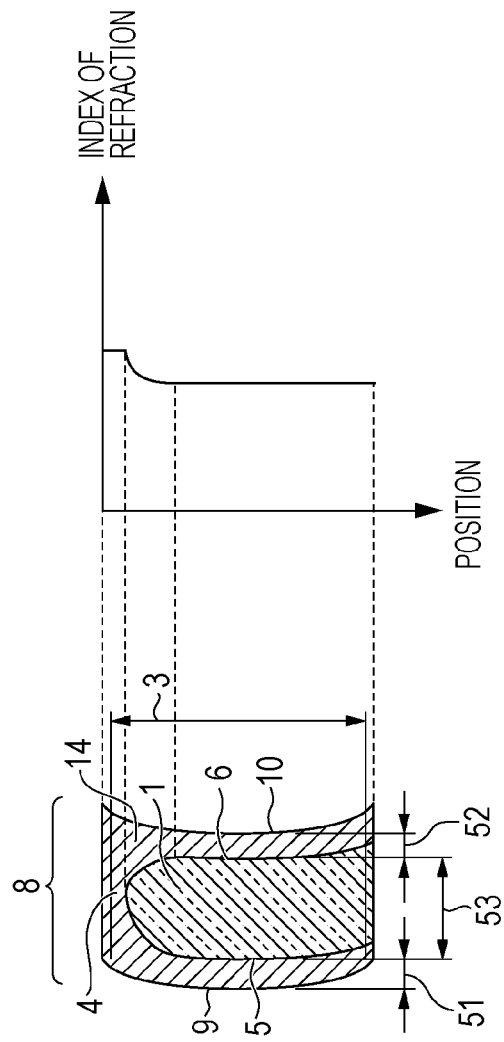
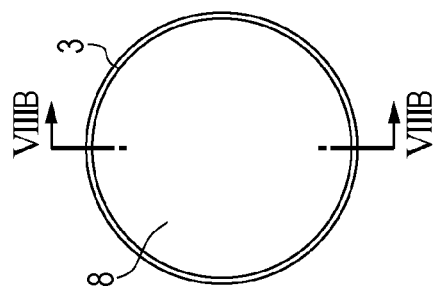

OPTICAL COMPONENT AND METHOD OF MAKING THE SAME

BACKGROUND OF THE INVENTION

1. Field of the Invention

The present invention relates to an optical component that is used for an optical apparatus such as a digital camera or a copier and a method of making the optical component.

2. Description of the Related Art

There's an increasing demand for making thick optical components by using an injection molding method in recent years. However, as the thickness of an optical component increases, an increase in stress occurs due to the difference between contraction of a surface plastic layer, which first solidifies during a molding process, and contraction of an inner plastic portion, which solidifies afterwards. Therefore, problems in that a vacuum bubble (void) is generated in the optical component and a residual internal stress remains in the optical component occur. There is another problem in that a considerably long cycle time is required to mold a thick optical component, because a considerably longer cooling time is required to cool a thicker optical component.

To address such problems, an invention related to an optical component including a core lens whose front and back optical surfaces are integrated with each other through a covering plastic has been disclosed (Japanese Patent Laid-Open No. 8-187793). As optical apparatuses such as digital cameras and copiers are becoming more compact, smaller optical components for such apparatuses have been demanded. However, with the method described in Japanese Patent Laid-Open No. 8-187793, a cavity space that is larger than the outer shape of the core lens is formed in a mold and a covering plastic is introduced onto the front and back optical surfaces of the core lens. Therefore, the outer shape of the optical component becomes larger than that of the core lens, so that it is difficult to reduce the size of the optical component with this method.

SUMMARY OF THE INVENTION

According to a first aspect of the present invention, an optical component includes a core lens and a molded portion formed from a covering plastic on each of front and back surfaces of the core lens. The core lens includes a recessed portion.

According to a second aspect of the present invention, a method of making an optical component includes inserting a core lens into a mold; forming a space between the mold and front and back surfaces of the core lens; and introducing a covering plastic into the space so as to be integrated with the core lens. The core lens includes a recessed portion and the covering plastic is introduced into the space through the recessed portion.

With the present invention, the outer shape of an optical component, which includes a core lens and a covering plastic that are integrated with each other, and the outer shape of the core lens can be made equivalent to each other. Therefore, a thick optical component having a smaller size can be obtained without increasing a molding time while preventing generation of a vacuum bubble (void) and a residual internal stress in the optical component.

Further features of the present invention will become apparent from the following description of exemplary embodiments with reference to the attached drawings.

BRIEF DESCRIPTION OF THE DRAWINGS

FIGS. 8A to 8C illustrate the second embodiment.

DESCRIPTION OF THE EMBODIMENTS

An optical component according to the present invention includes a core lens and a molded portion formed from a covering plastic on each of the front and back surfaces of the core lens. The core lens includes a recessed portion for introducing the covering plastic in a bifurcating manner onto the front and back optical surfaces of the core lens.

First Embodiment

FIGS. 1A to 3B illustrate an optical component according to a first embodiment of the present invention. The same parts will be denoted by the same numerals and redundant description will be omitted.

Figure 1A:
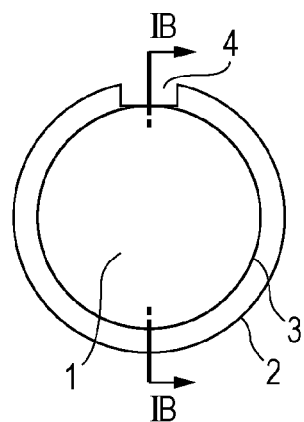
FIGS. 1A and 1B illustrate a first embodiment.
Figure 1B:
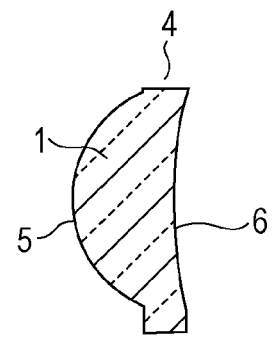

FIG. 1A is a plan view of a core lens 1 and FIG. 1B is a sectional view of the core lens 1 taken along line IB-IB of FIG. 1A. FIGS. 1A and 1B illustrate the core lens 1, an outer periphery 2 of the core lens 1, an optically effective area 3, a recessed portion 4, a front optical surface 5, and a back optical surface 6. In the present specification, the surfaces 5 and 6 will be referred to as the front and back surfaces 5 and 6 of the core lens 1. Which of the surfaces 5 and 6 is a front surface and which of these is a back surface are not particularly limited.

Figure 2:
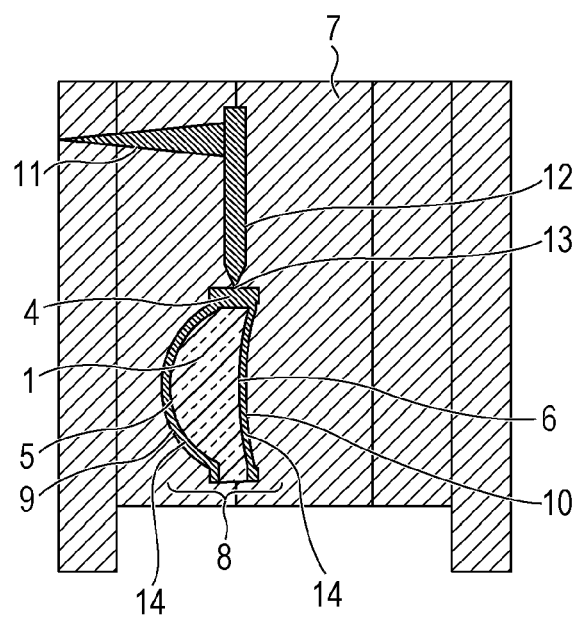
FIG. 2 is a sectional view of a mold.

FIG. 2 is a sectional view of an example of a mold for molding an optical component according to the present invention. FIG. 2 illustrates an optical component injection mold 7, an optical component 8, a front optical surface 9 of the optical component 8, and a back optical surface 10 of the optical component 8. In the present application, the surfaces 9 and 10 will be referred to as the front and back surfaces 9 and 10 of the optical component. Which of the surfaces 9 and 10 is a front surface and which of these is a back surface are not particularly limited. FIG. 2 also illustrates a sprue 11, a runner 12, a gate 13, and a covering plastic 14. The core lens 1 is inserted into the optical component injection mold 7 by using a positioning mechanism (not shown). Then, the covering plastic 14 can be introduced onto the front and back surfaces 5 and 6 of the core lens 1 by introducing the covering plastic 14 through the recessed portion 4 of the core lens 1. As a result, as illustrated in FIG. 3A, the size of the outer periphery 15 of the optical component 8 can be reduced to that of the outer periphery 2 of the core lens 1.

Figure 3A:
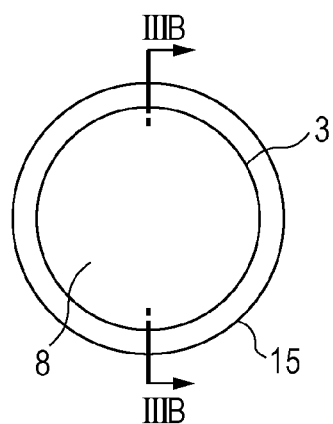
FIGS. 3A and 3B illustrate the first embodiment.
Figure 3B:
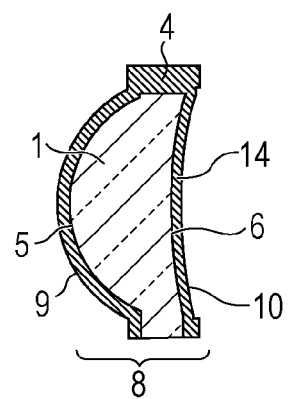
Figure 4A:
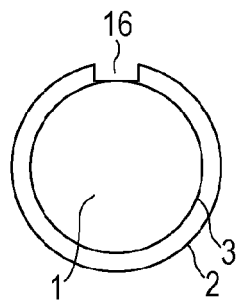
FIGS. 4A to 4K illustrate the first embodiment.
Figure 4B:
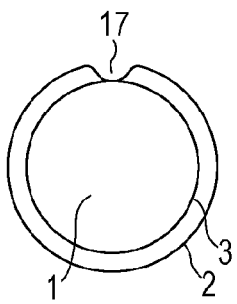
Figure 4C:
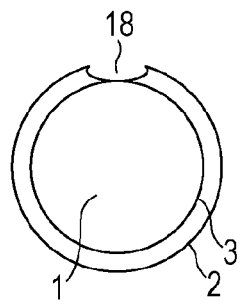
Figure 4D:
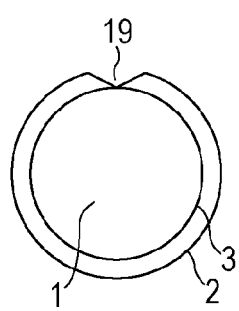
Figure 4E:
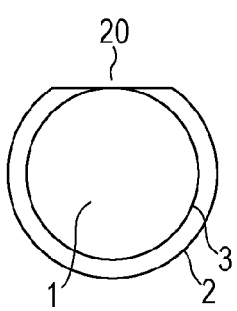
Figure 4F:
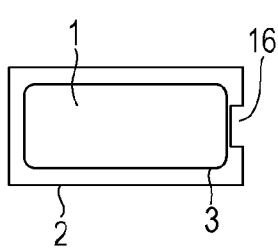
Figure 4G:
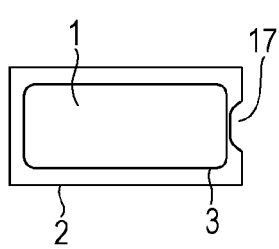
Figure 4H:
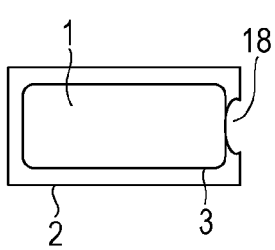
Figure 4I:
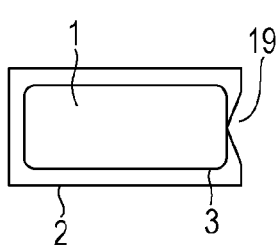
Figure 4J:
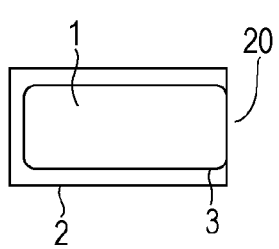
Figure 4K:
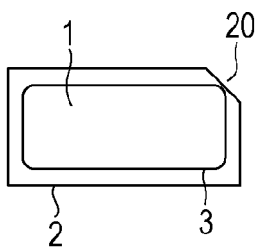

FIG. 3A is a plan view of the optical component 8 according to the present embodiment, and FIG. 3B is a sectional view of the optical component 8 taken along line IIIB-IIIB of FIG. 3A. FIG. 3A illustrates an outer periphery 15 of the optical component. The core lens 1 includes the recessed portion 4 for introducing the covering plastic in a bifurcating manner so that the covering plastic can be introduced onto the front and back surfaces 5 and 6 of the core lens 1 illustrated in FIG. 1. A molded portion is formed from the covering plastic on each of the front and back surfaces 5 and 6 of the core lens 1 by introducing the covering plastic through the recessed portion 4 onto the front and back surfaces 5 and 6 of the core lens 1. That is, the molded portion formed on the front surface of the core lens and the molded portion formed on the back surface of the core lens are connected to each other through at least the recessed portion.

Figure 5A:
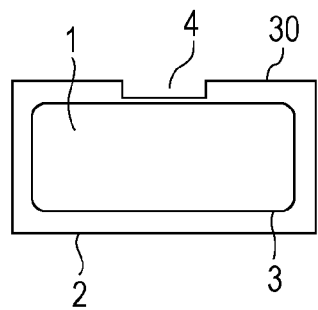
FIGS. 5A and 5B illustrate the first embodiment.
Figure 5B:
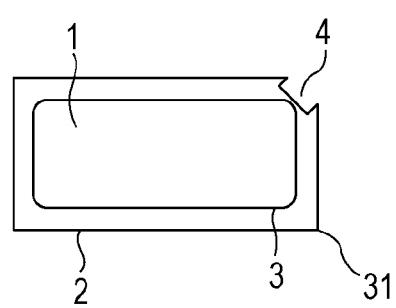

FIGS. 4A to 5B illustrate modifications of the shape of the recessed portion according to the present embodiment. The members the same as those of FIGS. 1A and 1B will be denoted by the same numerals and redundant description will be omitted. FIGS. 4A to 4K are plan views of core lenses. FIGS. 4A to 4E and 4F to 4K illustrate a rectangular recessed portion 16, a rounded rectangular recessed portion 17, an elliptic/arc-shaped recessed portion 18, a V-shaped recessed portion 19, and a D-cut-shaped recessed portion 20. FIGS. 5A and 5B are also plan views of core lenses, illustrating a longitudinal surface 30 and corners 31 of the core lenses. As illustrated in the figures, the recessed portion may have any shape and may be located at any position as long as the recessed portion can form a space by being recessed into the outer periphery 2 of the core lens 1. For example, if the core lens 1 has a circular shape, the recessed portion may be the rectangular recessed portion 16 illustrated in FIG. 4A, the rounded rectangular recessed portion 17 illustrated in FIG. 4B, the elliptic/arc-shaped recessed portion 18 illustrated in FIG. 4C, the V-shaped recessed portion 19 illustrated in FIG. 4D, or the D-cut-shaped recessed portion 20 illustrated in FIG. 4E. However, the recessed portion is not particularly limited to these. If the core lens 1 has a rectangular shape, the recessed portion may be the rectangular recessed portion 16 illustrated in FIG. 4F, the rounded rectangular recessed portion 17 illustrated in FIG. 4G, the elliptic/arc-shaped recessed portion 18 illustrated in FIG. 4H, the V-shaped recessed portion 19 illustrated in FIG. 4I, or the D-cut-shaped recessed portions 20 illustrated in FIGS. 4J and 4K. However, the shape of the recessed portion is not particularly limited as long as the recessed portion can form a space in the outer periphery 2 of the core lens 1. In FIGS. 5A and 5B, the recessed portions 4 are located in the core lens 1 at positions that are different from those of FIGS. 4F to 4K. FIG. 5A illustrates the core lens 1 in which the recessed portion 4 is formed in the longitudinal surface 30, and FIG. 5B illustrates the core lens 1 in which the recessed portion 4 is located at one of the corners 31. However, the position of the recessed portion is not particularly limited. The core lens 1 can be made by injection molding of a plastic material. However, another existing method such as a casting method or a compression method may be used. The plastic material may be a thermoplastic. Alternatively, a glass material may be used. The recessed portion may be formed by transferring the shape of a protrusion that is formed on the mold. Alternatively, the recessed portion may be formed by machining a molded core lens by using a cutting method or the like.

Figure 6:
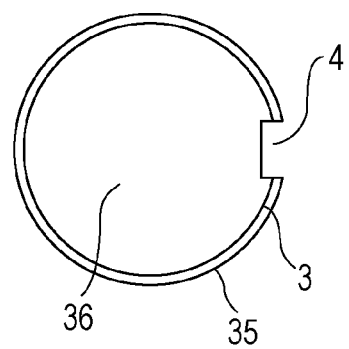
FIG. 6 illustrates the first embodiment.

The material of the covering plastic is not particularly limited as long as the material is a thermoplastic. The difference between the index of refraction of the core lens 1 and that of the covering plastic may be small. The difference in the index of refraction may be equal to or smaller than 0.001 at the used wavelength. If the difference in the index refraction is equal to or smaller than 0.001, the difference in the index of refraction is almost negligible in terms of the optical performance. As a result, even if the recessed portion 4 is formed in the optically effective area 3 of the core lens 1, the presence of an interface between the recessed portion 4 and the molded portion formed from the covering plastic 14 can be neglected. FIG. 6 is a plan view illustrating an example of a core lens in which the recessed portion 4 is formed in the optically effective area 3 of the core lens. FIG. 6 illustrates a core lens 36 and an outer periphery 35 of the core lens 36. As illustrated in FIG. 6, the recessed portion 4 can be disposed in the optically effective area 3. With such disposition, the size of the outer periphery 35 of the core lens 36 can be made nearly as small as that of the optically effective area 3. As a result, a thick optical component having a smaller size can be obtained without increasing a molding time while preventing generation of a vacuum bubble (void) and a residual internal stress in the optical component.

Referring to FIG. 3, the core lens 1 and the covering plastic 14 may be made of the same material. Examples of the material include a polycarbonate, a polymethyl methacrylate, a cycloolefin polymer, a cycloolefin-α-olefin copolymer, a polystyrene, a styrene-methylmethacrylate copolymer, and a fluorene polyester. However, the material is not particularly limited as long as the material is a thermoplastic. A plastic material in which inorganic particulates are dispersed can be used. The index of refraction of the material of the core lens 1 and the index of refraction of the material of the covering plastic 14 may be adjusted by using different materials for the core lens 1 and the covering plastic 14 and by dispersing inorganic particulates in each of these materials. Alternatively, the index of refraction of the material of the core lens 1 and the index of refraction of the material of the covering plastic 14 may be adjusted by dispersing inorganic particulates in one of these materials.

Second Embodiment

FIGS. 7A to 8C illustrate an optical component according to a second embodiment of the present invention. The same parts as those of FIGS. 1A to 3B will be denoted by the same numerals and redundant description will be omitted. The shape of the surface of the recessed portion 4 according to the present embodiment in at least the optically effective area is characterized in that the shape continuously changes. Moreover, in the present embodiment, the shape of the surface of the recessed portion 4 in at least the optically effective area may be a shape such that dY/dX is continuous in at least the optically effective area, where X is the optical axis direction and Y is a direction perpendicular to the optical axis direction in a cross section parallel to the optical axis.

Figure 7A:
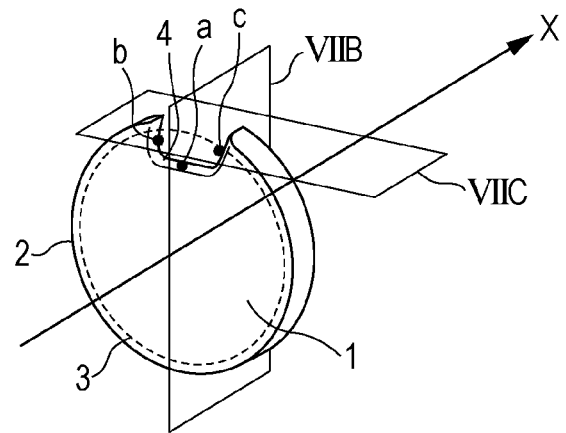
FIGS. 7A to 7C illustrate a second embodiment.
Figure 7B:
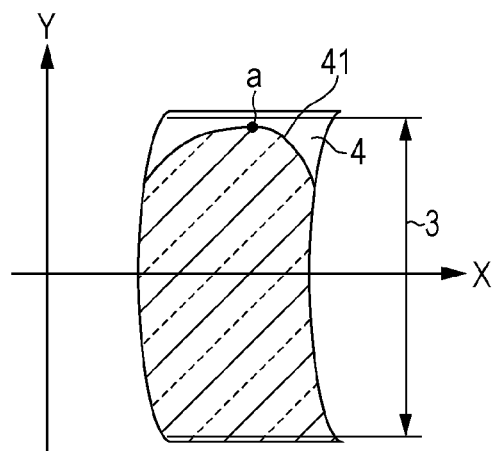
Figure 7C:
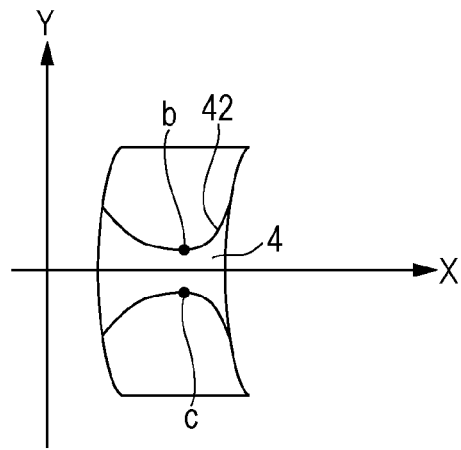

FIG. 7A is a perspective view of a core lens according to the present embodiment, FIG. 7B is a sectional view of the core lens taken along a plane VIIB that passes through the recessed portion 4 and that is parallel to the optical axis, and FIG. 7C is a sectional view of the core lens taken along a plane VIIC that passes through the recessed portion 4 and that is parallel to the optical axis and perpendicular to the plane VIIB. FIG. 7A illustrates the optical axis direction X, a directions Y perpendicular to the optical axis, the plane VIIB, which passes through the recessed portion 4 and which is parallel to the optical axis, and the plane VIIC, which passes through the recessed portion 4 and which is parallel to the optical axis and perpendicular to the plane VIIB. FIGS. 7A and 7B illustrate an extremum a of a function of X representing an intersection of the plane VIIB, which cuts the core lens 1, and the surface of the recessed portion 4. FIGS. 7A and 7C illustrate extrema b and c of a function of X representing an intersection of the plane VIIC, which cuts the core lens 1, and the surface of the recessed portion 4. FIG. 8A is a plan view of an optical component according to the present embodiment, FIG. 8B is a sectional view of the optical component taken along line VIIIB-VIIIB of FIG. 8A, and FIG. 8C is a conceptual diagram illustrating the relationship between the position in the lens and the average index of refraction of the lens in the optical axis direction.

As illustrated in FIGS. 7B and 7C, intersections 41 and 42 of the surface of the recessed portion 4 of the core lens 1 and a cross-sectional plane parallel to the optical axis include only smooth curves. That is, the intersections have shapes that continuously change in at least the optically effective area. The shape may be such that dY/dX is continuous.

It has been found that a bonded interface becomes less visible if the recessed portion 4 has such a shape. This is because, the optical component, in which the core lens and the molded portion formed from a covering plastic have been integrated with each other through the covering plastic, does not have a portion at which the index of refraction sharply changes but has a structure such that the index of refraction smoothly changes in the entirety thereof.

When the recessed portion 4 has such a shape, the optical performance of the optical component can be maintained even if the recessed portion 4 is disposed in the optically effective area. Therefore, the optically effective area can be expanded to as close as possible to the outer periphery of the optical component with respect to the optically designed value. That is, the outer periphery of the optical component need not be designed so as to have an allowance for the recessed portion. As a result, an optical component having a smaller size can be provided. Moreover, an optical component having a higher optical performance can be obtained because the bonded interface becomes less visible.

The core lens 1 illustrated in FIG. 7A has, for example, a circular shape as seen in the optical axis direction. However, the shape of a core lens according to the present invention is not limited to this shape. The outer shape of the core lens as seen in the optical axis direction may be a rectangular shape, an elliptical shape, an oval shape, or a polygonal shape. If the core lens 1 is, for example, a rectangular lens, the recessed portion 4 may be disposed in the core lens 1 near the center of the short side of the outer periphery, near the center of the long side of the outer periphery, or near a diagonal corner as seen in the optical axis direction. Likewise, the position of the recessed portion 4 is not particularly limited even if the core lens 1 has a different outer shape as seen in the optical axis direction.

As illustrated in FIG. 8B, the recessed portion 4 of the core lens of the optical component includes only a smooth curve in at least the optically effective area 3. That is, the recessed portion 4 has a shape that continuously changes in at least the optically effective area. The shape of the recessed portion 4 may be a shape such that dY/dX is continuous in the optically effective area, where X is the optical axis direction and Y is a direction perpendicular to the optical axis direction in a cross-sectional plane parallel to the optical axis. Because the recessed portion has a shape that continuously changes, the optical component according to the present embodiment does not have a portion at which the index of refraction sharply changes when seen in the optical axis direction but has a structure such that the index of refraction continuously changes. Thus, the bonded interface is not visible (see FIG. 8C). Therefore, the optically effective area can be expanded to as close as possible to the outer periphery of the optical component, and thereby the optical component 8 having a smaller size can be obtained.

In the present embodiment, the core lens 1 has a meniscus shape. However, the shape of the lens according to the present invention is not limited to this shape. The present invention can be applied to variety of lenses, such as a convex lens, a concave lens, a cylindrical lens, an fθ lens, and a Fresnel lens.

FIGS. 9A to 10C illustrate modifications of a recessed portion of a core lens according to the present embodiment. The same parts as those of FIGS. 7A to 8C will be denoted by the same numerals and redundant description will be omitted.

Figure 9A:
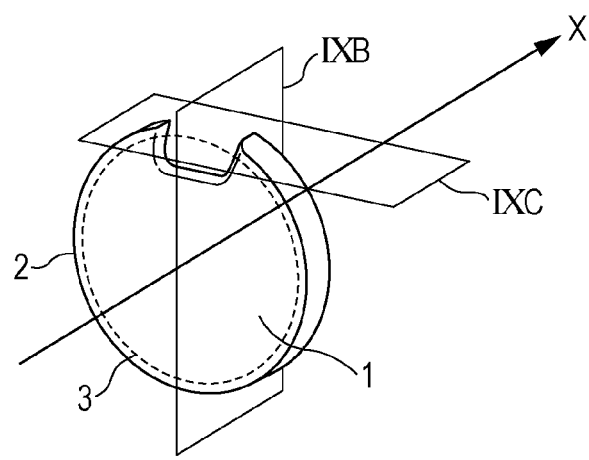
FIGS. 9A to 9C illustrate the second embodiment.
Figure 9B:
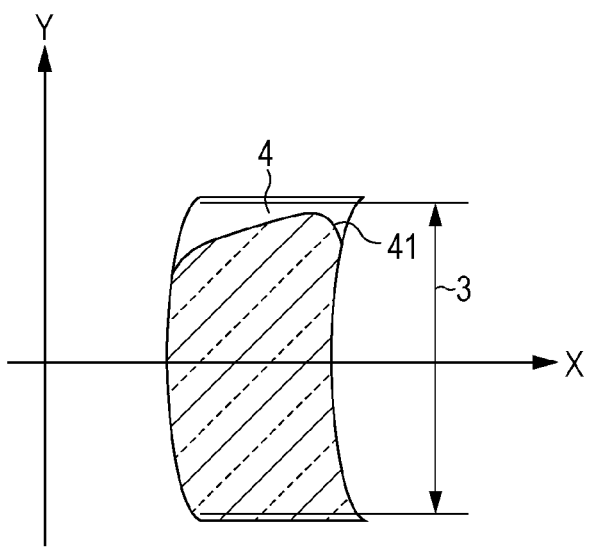
Figure 9C:
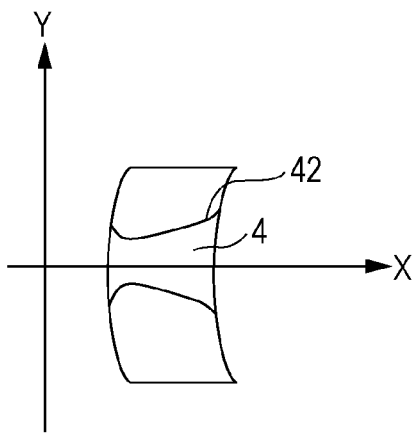

FIGS. 9A to 9C illustrate a core lens 1 according to a modification of the present embodiment. FIG. 9A is a perspective view of the core lens 1, FIG. 9B is a sectional view of the core lens 1 taken along a plane IXB that passes through the recessed portion 4 and that is parallel to the optical axis, and FIG. 9C is a sectional view of the core lens taken along a plane IXC that passes through the recessed portion 4 and that is parallel to the optical axis and perpendicular to the plane IXB. As illustrated in FIG. 9B, in at least the optically effective area 3, an intersection 41 of the surface of the recessed portion 4 of the core lens 1 and the plane IXB, which is parallel to the optical axis, includes a smoothly curved portion and a linear portion that is not parallel to the optical axis and continuously changes in at least the optically effective area 3. The shape of the intersection may be such that dY/dX is continuous. An intersection 42 of the plane IXC, which passes through the recessed portion 4 and which is parallel to the optical axis, and the surface of the recessed portion of the core lens 1 includes a smoothly curved portion and a linear portion that is not parallel to the optical axis and continuously changes in at least the optically effective area 3. The shape of the intersection may be such that dY/dX is continuous.

With such a shape, the optical component, in which the core lens and the covering plastic have been integrated with each other, does not have a portion at which the index of refraction sharply changes but has a structure such that the index of refraction smoothly changes in the entirety thereof. Therefore, the bonded interface becomes invisible. As a result, because the optical performance can be maintained even if the recessed portion 4 is disposed in the optically effective area 3, it is not necessary to design the outer shape of the optical component so that the optical component has an allowance for the recessed portion with respect to the optically designed value, and thereby an optical component having a smaller size can be provided.

Figure 10A:
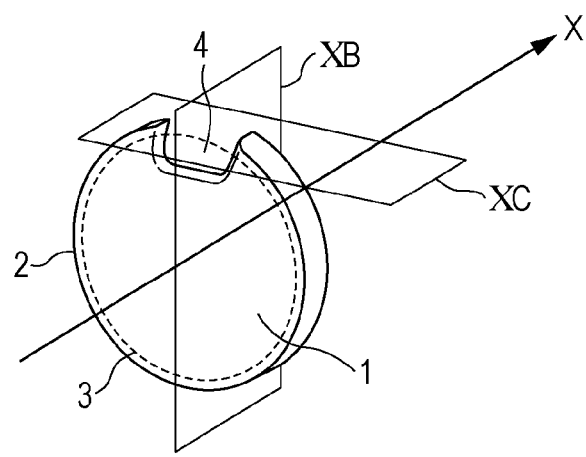
FIGS. 10A to 10C illustrate the second embodiment.
Figure 10B:
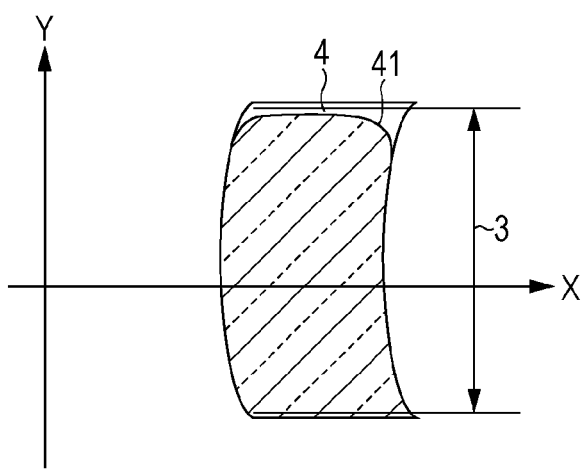
Figure 10C:
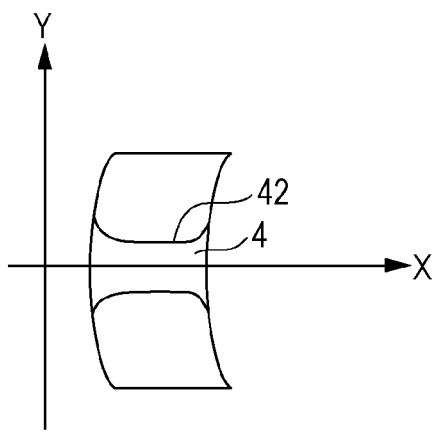

FIGS. 10A to 10C illustrate a core lens 1 according to another modification of the present embodiment. FIG. 10A is a perspective view of the core lens 1, FIG. 10B is a sectional view of the core lens 1 taken along a plane XB that passes through the recessed portion 4 and that is parallel to the optical axis, and FIG. 10C is a sectional view of the core lens 1 taken along a plane XC that passes through the recessed portion 4 and that is parallel to the optical axis and perpendicular to the plane XB. As illustrated in FIG. 10B, in at least the optically effective area 3, an intersection 41 of the surface of the recessed portion 4 of the core lens 1 and the plane XB, which is parallel to the optical axis, includes a smoothly curved portion and a linear portion that is parallel to the optical axis and continuously changes in at least the optically effective area 3. The shape of the intersection may be such that dY/dX is continuous. An intersection 42 of the plane XC, which passes through the recessed portion 4 and which is parallel to the optical axis, and the surface of the recessed portion of the core lens 1 includes a smoothly curved portion and a linear portion that is parallel to the optical axis and continuously changes in at least the optically effective area 3. The shape of the intersection may be such that dY/dX is continuous. With such a shape, the optical component, in which the core lens and the covering plastic are integrated with each other, does not have a portion in which the index of refraction sharply changes but has a structure such that the index of refraction smoothly changes in the entirety thereof. Therefore, the bonded interface becomes invisible. As a result, because the optical performance can be maintained even if the recessed portion 4 is disposed in the optically effective area 3, it is not necessary to design the outer shape of the optical component so that the optical component has an allowance for the recessed portion with respect to the optically designed value, and thereby an optical component having a smaller size can be provided.

The shapes of the core lenses according to typical modifications of the present embodiment illustrated in FIGS. 9A to 10C are examples.

The material of the covering plastic according to the present embodiment is not particularly limited as long as the material is a thermoplastic. The difference in the index of refraction between the core lens 1 and the covering plastic may be small. The difference in the index of refraction may be equal to or smaller than 0.001 at the used wavelength. If the difference in the index refraction is equal to or smaller than 0.001, the difference in the index of refraction is almost negligible in terms of the optical performance. As a result, even if the recessed portion 4 is formed in the optically effective area 3 of the core lens 1, the presence of interface between the recessed portion 4 and the molded portion formed from the covering plastic 14 can be neglected.

The core lens 1 and the covering plastic 14 may be made of the same material. Examples of the material include a polycarbonate, a polymethyl methacrylate, a cycloolefin polymer, a cycloolefin-α-olefin copolymer, a polystyrene, a styrene-methylmethacrylate copolymer, and a fluorene polyester. However, the material is not particularly limited as long as the material is a thermoplastic. A plastic material in which inorganic particulates are dispersed can be used. The index of refraction of the material of the core lens 1 and the index of refraction of the material of the covering plastic 14 may be adjusted by using different materials and by dispersing inorganic particulates in both of these materials. Alternatively, the index of refraction of the material of the core lens 1 and the index of refraction of the material of the covering plastic 14 may be adjusted by dispersing inorganic particulates in one of these materials.

Method of Making Optical Component

Referring to FIGS. 11A to 13D, an example of a method of making an optical component according to an embodiment of the present invention will be described. The same parts as those illustrated in FIGS. 1A to 3B will be denoted by the same numerals and redundant description will be omitted.

First, a core lens is made by using an injection molding method. Then, the core lens is inserted into a cavity in an injection mold, and a covering plastic is introduced into spaces between the mold and the front and back surfaces of the core lens through the recessed portion. Then, molded portions are formed on the front and back surfaces of the core lens, and the core lens and the molded portion are integrated with each other, thereby making an optical component.

Figure 11A:
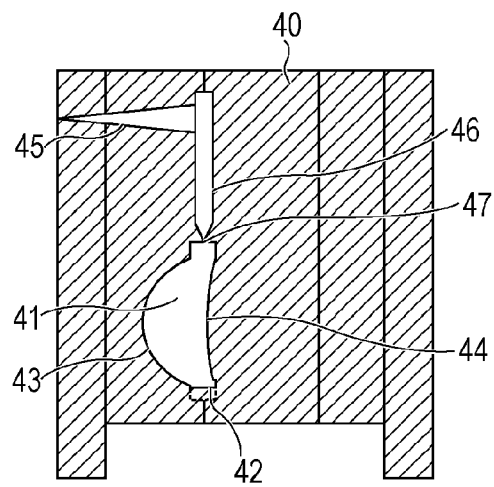
FIGS. 11A to 11D are sectional views of molds.
Figure 11B:
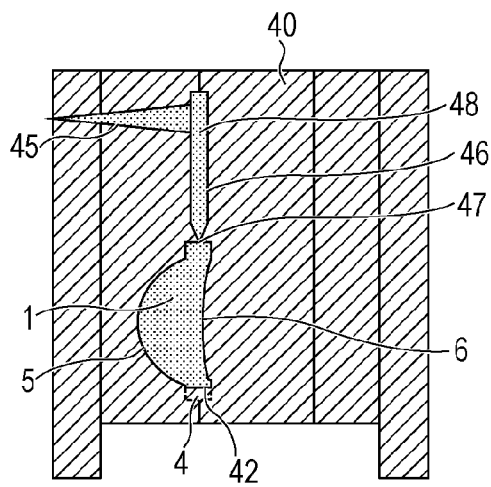

FIGS. 11A to 11D are sectional views of molds for making an optical component according to the present embodiment. FIGS. 11A and 11B illustrate a core lens injection mold 40, a cavity 41, a protruding portion 42, and a gate 47. FIG. 12 is a sectional view of an optical component made by the method of making an optical component according to the present embodiment. As illustrated in FIG. 12, the molded portions formed from the covering plastic have thicknesses 51 and 52, and the core lens has a thickness 53. FIGS. 13A to 13D are sectional views of modifications of an optical component made by the method of making an optical component according to the present embodiment.

FIG. 11A illustrates the core lens injection mold 40, for forming a core lens, and the cavity 41. The core lens injection mold 40 has the protruding portion 42, which corresponds to a recessed portion of a core lens, so that the recessed portion can be formed in the core lens. As illustrated in FIG. 11B, a melted plastic for forming the core lens is introduced into the cavity 41 through the sprue 45, the runner 46, and the gate 47, thereby forming the core lens 1 having a recessed portion 4. At this time, the positional relationship between the gate 47 and the protruding portion 42 is arbitrary.

Figure 11C:
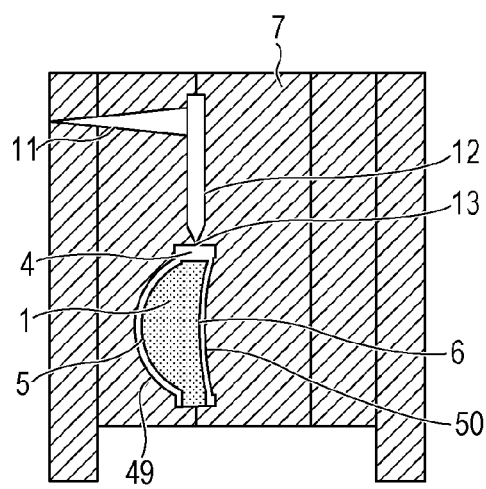
Figure 11D:
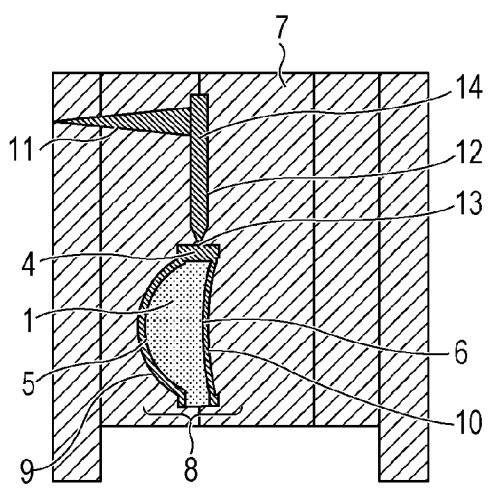
Figure 12:
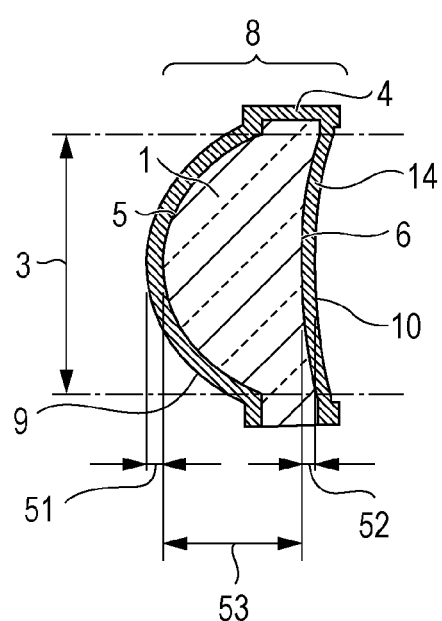
FIG. 12 illustrates an optical component according to the present invention.
Figure 13A:
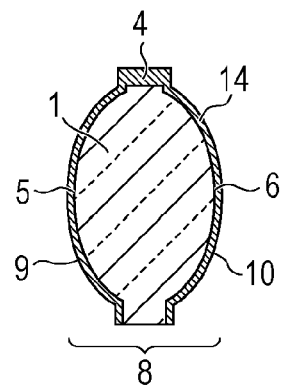
FIGS. 13A to 13D illustrate modifications of an optical component according to the present invention.
Figure 13B:
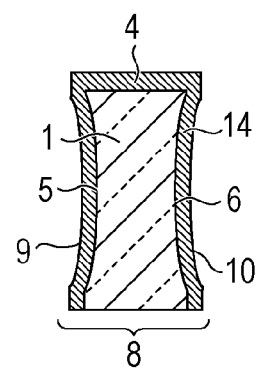
Figure 13C:
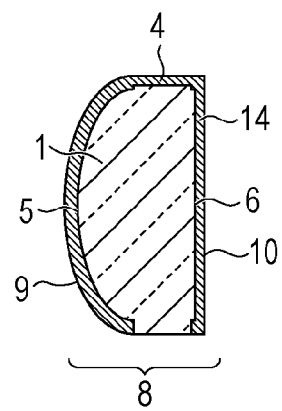
Figure 13D:
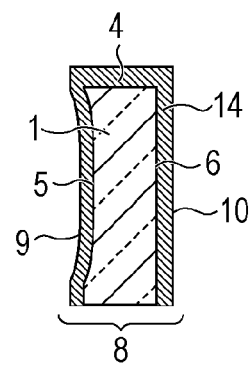

Next, the core lens 1 is inserted into the optical component injection mold 7 illustrated in FIG. 11C by using a positioning mechanism (not shown). The optical component injection mold 7 is configured such that spaces are formed between the front and back surfaces 5 and 6 of the core lens and mold surfaces 49 and 50. Moreover, a space is formed between the recessed portion of the core lens and the optical component injection mold 7. Then, as illustrated in FIG. 11D, a covering plastic 14 is introduced into the space between the optical component injection mold 7 and the recessed portion 4 of the core lens 1 through the sprue 11, the runner 12, and the gate 13. By introducing the melted covering plastic into the space between the recessed portion 4 and the mold, the melted covering plastic can be smoothly introduced into the spaces between the front and back surfaces 5 and 6 of the core lens and the mold surfaces 49 and 50. Subsequently, the optical component 8, in which the core lens 1 and the covering plastic 14 are integrated with each other, is obtained by performing a cooling process, a mold opening process, and an ejection process (not shown). Because the covering plastic 14 is introduced into the spaces between the mold and the recessed portion 4 of the core lens 1, it is not necessary that the outer periphery of the optical component be larger than the outer periphery of the core lens 1. Therefore, the optical component 8 having a large thickness and a smaller size can be made.

The shape of the core lens is not particularly limited. The shape may be a meniscus shape illustrated in FIG. 12, a biconvex shape illustrated in FIG. 13A, a biconcave shape illustrated in FIG. 13B, a plano-convex shape illustrated in FIG. 13C, or a plano-concave shape illustrated in FIG. 13D. The shapes of the front and back surfaces (in particular, the shape of the optical surface, which is the shape of the optically effective area 3, are not particularly limited. The front and back surfaces each may be a spherical surface, an aspherical surface, or a free-form curved surface. However, as illustrated in FIG. 12, in at least the optically effective area 3, the shapes of the front and back surfaces 5 and 6 of the core lens 1 may be substantially similar to the shapes of the front and back surfaces 9 and 10 of the optical component 8. In at least the optically effective area 3, the thicknesses 51 and 52 of a molded portion of the covering plastic 14 that covers the front and back surfaces 5 and 6 of the core lens 1 may be substantially the same. In at least the optically effective area 3, the sum of the thicknesses of the covering plastic that covers the front and back surfaces 5 and 6 of the core lens 1 may be equal to or smaller than the thickness 53 of the core lens 1. In such cases, deformation of the optical component due to contraction after being molded can be reduced.

In the method of making an optical component according to the present invention, the molded portion may be made of a material having the same index of refraction as the core lens 1.

EXAMPLES

Next, examples of the present invention will be described. However, the present invention is not limited to these examples.

Example 1

An example 1 will be described.

First, a core lens injection mold was placed in an injection molding machine, and a melted plastic (cycloolefin) for forming a core lens was introduced into the mold through a sprue, a runner, and a gate. Subsequently, a core lens was obtained by performing a cooling process, a mold opening process, and an ejection process. The core lens was a meniscus lens having a central thickness of 6 mm and an oval shape with a height of 16 mm and a width of 18 mm. The core lens had an optically effective area having an oval shape with a height of 12 mm and a width of 14 mm therein. The recessed portion had a width of 4 mm and a depth of 2 mm. The recessed portion was formed along the draft, and a part of the recessed portion was disposed in the optically effective area.

Next, an optical component injection mold was placed in an injection molding machine. The core lens was inserted into the optical component injection mold by using a positioning mechanism. Next, a covering plastic (cycloolefin) was introduced into spaces between mold surfaces and the front and back surfaces of the core lens through a sprue, a runner, a gate, and a recessed portion of the core lens, thereby forming molded portions on the front and back surfaces of the core lens. Subsequently, an optical component was obtained by performing a cooling process, a mold opening process, and an ejection process.

The outer dimension of the optical component was the same as that of the core lens, and the thickness of each of the molded portions formed from the covering plastic was 3 mm. Thus, an optical component that did not have a vacuum bubble (void) generated therein and that had an outer dimension reduced to be the same as that of the core lens was obtained.

Example 2

An example 2 will be described. In the present example, combinations of melted plastics shown in Table 1 were used for a core lens and the covering plastic.

TABLE 1

|  | Core Lens | Covering Plastic |
|---|---|---|
| Combination 1 | polycarbonate | polycarbonate |
| Combination 2 | polymethyl methacrylate | polymethyl methacrylate |
| Combination 3 | cycloolefin | cycloolefin |
| Combination 4 | cycloolefin-α-olefin copolymer | cycloolefin-α-olefin copolymer |
| Combination 5 | polystyrene | polystyrene |
| Combination 6 | styrene-methylmethacrylate copolymer | styrene-methylmethacrylate copolymer |
| Combination 7 | fluorene polyester | fluorene polyester |

First, a core lens injection mold was placed in an injection molding machine, and a melted plastic for forming a core lens was introduced into the mold through a sprue, a runner, and a gate. Subsequently, a core lens was obtained by performing a cooling process, a mold opening process, and an ejection process. The core lens was a meniscus lens having a central thickness of 6 mm and an oval shape with a height of 14 mm and a width of 16 mm. The core lens had an optically effective area having an oval shape with a height of 12 mm and a width of 14 mm therein. The recessed portion had a width of 4 mm and a depth of 2 mm. The recessed portion was formed along the draft, and a part of the recessed portion was disposed in the optically effective area.

Next, an optical component injection mold was placed in an injection molding machine. The core lens was inserted into the optical component injection mold by using a positioning mechanism. Next, a covering plastic was introduced into spaces between mold surfaces and the front and back surfaces of the core lens through a sprue, a runner, a gate, and a recessed portion of the core lens, thereby forming molded portions on the front and back surfaces of the core lens. Subsequently, an optical component was obtained by performing a cooling process, a mold opening process, and an ejection process.

For each combination of the materials, the outer dimension of the optical component was the same as that of the core lens, and the thickness of the each of the molded portions formed from the covering plastic was 3 mm. Thus, an optical component that did not have a vacuum bubble (void) generated therein and that had an outer dimension reduced to be the same as that of the core lens was obtained.

Example 3

An example 3 will be described.

First, a core lens injection mold was placed in an injection molding machine, and a melted plastic (styrene-methylmethacrylate copolymer) for forming a core lens was introduced into the mold through a sprue, a runner, and a gate. Subsequently, a core lens was obtained by performing a cooling process, a mold opening process, and an ejection process. The core lens was a meniscus lens having a central thickness of 6 mm and an oval shape with a height of 20 mm and a width of 15 mm. The core lens had an optically effective area that expanded to as close as possible to the outer periphery thereof. The recessed portion was disposed in the optically effective area and had a width of 3 mm and a depth of 2 mm. The intersection of the recessed portion and a cross-sectional plane parallel to the optical axis included only a smoothly curved portion. The shape of the recessed portion continuously changed in the optically effective area.

Next, an optical component injection mold was placed in an injection molding machine. The core lens was inserted into the optical component injection mold by using a positioning mechanism. Next, a covering plastic (styrene-methylmethacrylate copolymer) was introduced into spaces between mold surfaces and the front and back surfaces of the core lens through a sprue, a runner, a gate, and a recessed portion of the core lens, thereby forming molded portions on the front and back surfaces of the core lens. Subsequently, an optical component was obtained by performing a cooling process, a mold opening process, and an ejection process.

The outer dimension of the optical component was the same as that of the core lens, and the thickness of each of the molded portions formed from the covering plastic was 3 mm. The optical component did not have a portion in the lens at which the index of refraction sharply changed but the index of refraction smoothly changed when viewed in the direction of the optical axis, so that a bonded interface was completely invisible. Thus, an optical component that did not have a vacuum bubble (void) generated therein and that had an outer dimension reduced to be the same as that of the core lens was obtained.

Example 4

An example 4 will be described.

First, a core lens injection mold was placed in an injection molding machine, and a melted plastic (cycloolefin) for forming a core lens was introduced into the mold through a sprue, a runner, and a gate. Subsequently, a core lens was obtained by performing a cooling process, a mold opening process, and an ejection process. The core lens was a meniscus lens having a central thickness of 6 mm and circular shape having an outside diameter of 15 mm. The core lens had an optically effective area that expanded to as close as possible to the outer periphery thereof. The recessed portion was disposed in the optically effective area and had a width of 3 mm and a depth of 2 mm. The intersection of the recessed portion and a cross-sectional plane parallel to the optical axis included a smoothly curved portion and a linear portion, and the shape of the recessed portion continuously changed in the optically effective area. To be specific, the recessed portion included a round portion, a quadratic curve portion, and a linear portion with $\theta=10°$, which were smoothly connected to each other. Here, $\theta$ denotes the angle between the linear portion and the optical axis X.

Next, an optical component injection mold was placed in an injection molding machine. The core lens was inserted into the optical component injection mold by using a positioning mechanism. Next, a covering plastic (cycloolefin) was introduced into spaces between mold surfaces and the front and back surfaces of the core lens through a sprue, a runner, a gate, and a recessed portion of the core lens, thereby forming molded portions on the front and back surfaces of the core lens. Subsequently, an optical component was obtained by performing a cooling process, a mold opening process, and an ejection process.

The outer dimension of the optical component was the same as that of the core lens, and the thickness of each of the molded portions formed from the covering plastic was 3 mm. The optical component did not have a portion in the lens at which the index of refraction sharply changed but the index of refraction smoothly changed when viewed in the direction of the optical axis, so that the bonded interface was completely invisible. Thus, an optical component that did not have a vacuum bubble (void) generated therein and that had an outer dimension reduced to be the same as that of the core lens was obtained.

Example 5

An example 5 will be described below.

First, a core lens injection mold was placed in an injection molding machine, and a melted plastic (cycloolefin) for forming a core lens was introduced into the mold through a sprue, a runner, and a gate. Subsequently, a core lens was obtained by performing a cooling process, a mold opening process, and an ejection process. The core lens was a meniscus lens having a central thickness of 6 mm and circular shape having an outside diameter of 15 mm. The core lens had an optically effective area that extended to as close as possible to the outer periphery thereof. The recessed portion was disposed in the optically effective area and had a width of 3 mm and a depth of 2 mm. The intersection of the recessed portion and a cross-sectional plane parallel to the optical axis included a smoothly curved portion and a linear portion, and the shape of the recessed portion continuously changed in the optically effective area. To be specific, the recessed portion included a round portion, a quadratic curve portion, and a linear portion with $\theta=0°$, which were smoothly connected to each other. Here, $\theta$ was the angle between the linear portion and the optical axis X. Next, an optical component injection mold was placed in an injection molding machine. The core lens was inserted into the optical component injection mold by using a positioning mechanism.

Next, a covering plastic (cycloolefin) was introduced into spaces between mold surfaces and the front and back surfaces of the core lens through a sprue, a runner, a gate, and a recessed portion of the core lens, thereby forming molded portions on the front and back surfaces of the core lens. Subsequently, an optical component was obtained by performing a cooling process, a mold opening process, and an ejection process. The outer dimension of the optical component was the same as that of the core lens, and the thickness of each of the molded portions formed from the covering plastic was 3 mm.

The optical component did not have a portion in the lens at which the index of refraction sharply changed but the index of refraction smoothly changed when viewed in the direction of the optical axis, so that the bonded interface was completely invisible. Thus, an optical component that did not have a vacuum bubble (void) generated therein and that had an outer dimension reduced to be the same as that of the core lens was obtained.

Example 6

An example 6 will be described.

First, a core lens injection mold was placed in an injection molding machine, and a melted plastic (styrene-methylmethacrylate copolymer) for forming a core lens was introduced into the mold through a sprue, a runner, and a gate. Subsequently, a core lens was obtained by performing a cooling process, a mold opening process, and an ejection process. The core lens was a meniscus lens having a central thickness of 6 mm and an oval shape with a height of 20 mm and a width of 15 mm. The core lens had an optically effective area extends to as close as possible to the outer periphery thereof. A recessed portion was disposed in the optically effective area and had a width of 3 mm and a depth of 2 mm. The intersection the recessed portion and a cross-sectional plane parallel to the optical axis included a smoothly curved portion and a linear portion. The recessed portion had a shape that continuously changed in the optically effective area. To be specific, the recessed portion included a round portion, a quadratic curve portion, and a linear portion with an angle $\theta$, which were smoothly connected to each other. Five core lenses including linear portions having an angle $\theta$ of $0°$, $0.5°$, $1°$, $5°$, and $10°$ were used.

Next, an optical component injection mold was placed in an injection molding machine. Each of the five core lenses was inserted into the optical component injection mold by using a positioning mechanism. Next, a covering plastic (styrene-methylmethacrylate copolymer) was introduced into spaces between mold surfaces and the front and back surfaces of the core lens through a sprue, a runner, a gate, and a recessed portion of the core lens, thereby forming molded portions on the front and back surfaces of the core lens. Subsequently, an optical component was obtained by performing a cooling process, a mold opening process, and an ejection process.

The outer dimension of the optical component was the same as that of the core lens, and the thickness of each of the molded portions made of the covering plastic was 3 mm. Table 2 shows the result of visual inspection of these optical components. In Table 2, "Fair" means that a bonded interface was not visible to the naked eye but visible through a reflection microscope, although the optical component had a fair quality. In Table 2, "Good" means that a bonded interface was not visible to the naked eye and even through a reflection microscope and a transmissive microscope.

TABLE 2

| θ = 0° | θ = 0.5° | θ = 1° | θ = 5° | θ = 10° |
|--------|----------|--------|--------|---------|
| Fair | Fair | Good | Good | Good |

As a result, when the angle θ between the linear portion and the optical axis X was equal to or larger than one degree, an optical component in which a bonded interface was not visible and that had an improved optical performance and a smaller size was obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-047830 filed Mar. 4, 2011, which is hereby incorporated by reference herein in its entirety.

What is claimed is:

1. A method of making an optical component comprising:
   inserting a core lens into a mold, wherein the core lens has a recessed portion, only one recessed portion of which forms a space by being recessed into an outer periphery, and is recessed to reach an optically effective area; and
   introducing a covering plastic into a space between the mold and a front surface of the core lens, a space between the mold and a back surface of the core lens and the one recessed portion of the optically effective area by introducing the covering plastic through the one recessed portion.

2. The method of making an optical component according to claim 1,
   wherein a shape of a surface of the recessed portion in the optically effective area is a shape such that dY/dX is continuous in at least the optically effective area, where X is an optical axis direction and Y is a direction perpendicular to the optical axis direction in a cross section parallel to the optical axis.

3. The method of making an optical component according to claim 1,
   wherein, when the recessed portion includes a linear portion in a cross section parallel to an optical axis, an angle between the optical axis and the linear portion is equal to or larger than one degree.

4. The method of making an optical component according to claim 1,
   wherein the core lens and the covering plastic have the same index of refraction.

5. The method of making an optical component according to claim 1,
   wherein the core lens and the covering plastic are made of the same material.

6. The method of making an optical component according to claim 1,
   wherein the core lens and the covering plastic are made of the material including a polycarbonate, a polymethyl methacrylate, a cycloolefin polymer, a cycloolefin-α-olefin copolymer, a polystyrene, a styrene-methyl-methacrylate copolymer, or a fluorene polyester.

7. The method of making an optical component according to claim 1,
   wherein the core lens and the covering plastic are made of the material including a plastic material in which inorganic particulates are dispersed.

8. The method of making an optical component according to claim 1,
   wherein the index of refraction of the material of the core lens and the index of refraction of the material of the covering plastic are adjusted by using different materials and by dispersing inorganic particulates in both of these materials.

9. The method of making an optical component according to claim 1,
   wherein the index of refraction of the material of the core lens and the index of refraction of the material of the covering plastic are adjusted by dispersing inorganic particulates in one of these materials.

* * * * *